Figure 1:
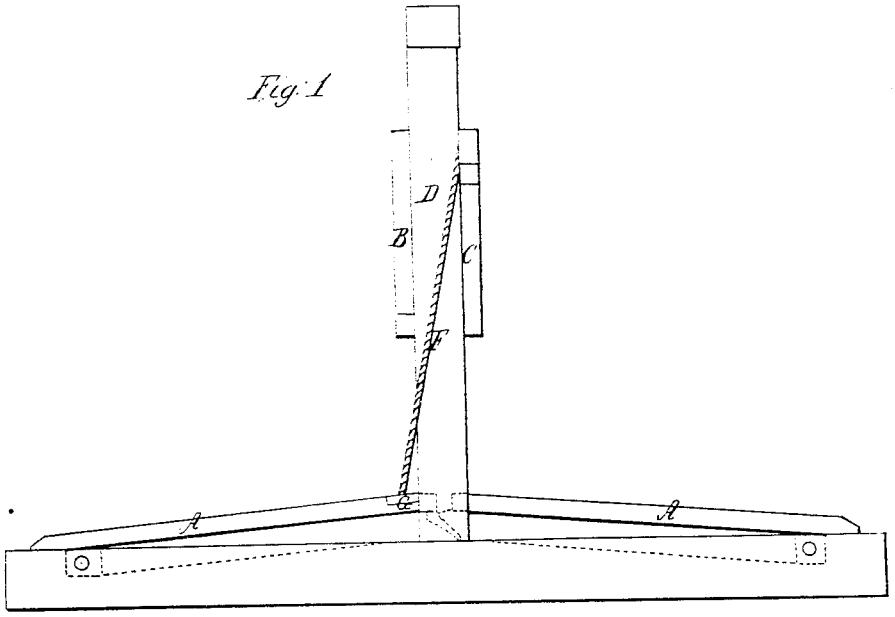
Figure 2:
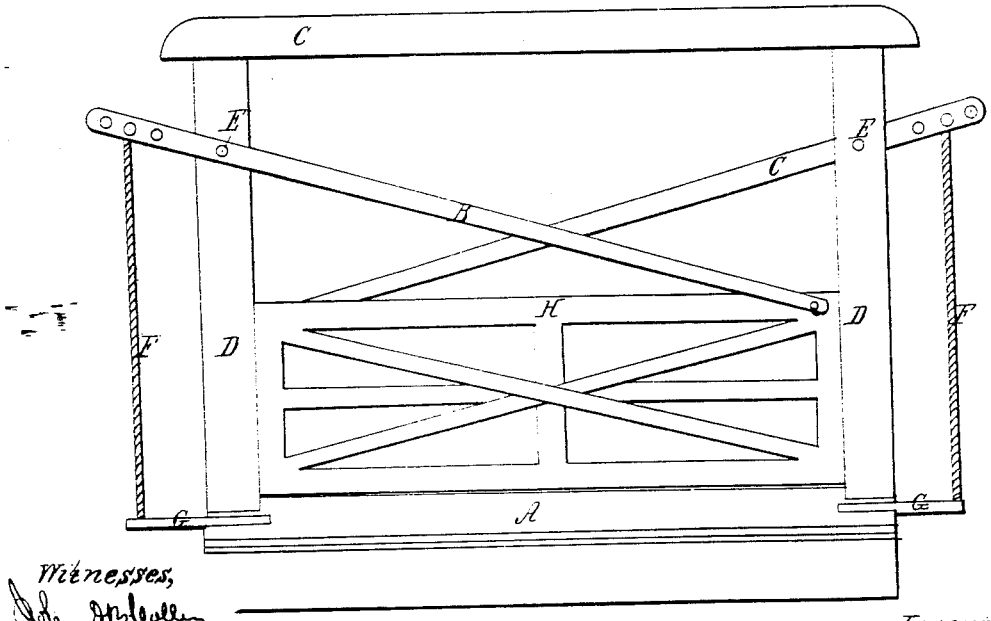

49-275

BEST AVAILABLE COPY

BEST AVAILABLE COPY

C. N. Cole,

Automatic Gate,

No. 164. A. I. June 9, 1857.

Witnesses,
John D. Ayleller
C. K. Coliff

Inventor:
Charles N. Cole

N. PETERS, PHOTO-LITHOGRAPHER, WASHINGTON, D. C.